United States Patent
Liu et al.

(10) Patent No.: US 11,667,743 B2
(45) Date of Patent: Jun. 6, 2023

(54) RESIN COMPOSITION, AND PRE-PREG, METAL-CLAD LAMINATE, AND PRINTED CIRCUIT BOARD PREPARED USING THE SAME

(71) Applicant: TAIWAN UNION TECHNOLOGY CORPORATION, Chupei (TW)

(72) Inventors: Shur-Fen Liu, Chupei (TW); Jau-Yu Chiou, Chupei (TW); Jen-Chi Chiang, Chupei (TW)

(73) Assignee: TAIWAN UNION TECHNOLOGY CORPORATION, Chupei (TW)

( * ) Notice: Subject to any disclaimer, the term of this patent is extended or adjusted under 35 U.S.C. 154(b) by 236 days.

(21) Appl. No.: 17/068,671

(22) Filed: Oct. 12, 2020

(65) Prior Publication Data
US 2021/0355259 A1 Nov. 18, 2021

(30) Foreign Application Priority Data
May 15, 2020 (TW) ................. 109116305

(51) Int. Cl.
*C08F 279/02* (2006.01)
*C08L 71/12* (2006.01)
*B32B 15/14* (2006.01)
*C08J 5/24* (2006.01)
*C08L 9/00* (2006.01)

(52) U.S. Cl.
CPC ............ *C08F 279/02* (2013.01); *B32B 15/14* (2013.01); *C08J 5/244* (2021.05); *C08L 9/00* (2013.01); *C08L 71/123* (2013.01); *C08L 71/126* (2013.01); *B32B 2260/046* (2013.01); *B32B 2457/08* (2013.01); *C08J 2351/04* (2013.01); *C08J 2371/12* (2013.01); *C08J 2451/04* (2013.01)

(58) Field of Classification Search
CPC .............. C08L 55/00–04; C08L 45/00; C08L 9/00–10; C08L 79/085; C08L 33/24; C08L 71/12; C08L 71/126
See application file for complete search history.

(56) References Cited

U.S. PATENT DOCUMENTS

| | | | |
|---|---|---|---|
| 5,218,030 A | 6/1993 | Katayose et al. | |
| 5,352,745 A | 10/1994 | Katayose et al. | |
| 6,352,782 B2 | 3/2002 | Yeager et al. | |
| 6,524,717 B1 | 2/2003 | Takano et al. | |
| 6,995,195 B2 | 2/2006 | Ishii et al. | |
| 9,902,695 B1* | 2/2018 | Das ...................... | C08F 136/20 |
| 10,590,223 B2 | 3/2020 | Kitai et al. | |
| 2014/0255711 A1* | 9/2014 | Chen ..................... | C08L 71/123 524/508 |
| 2015/0353730 A1* | 12/2015 | Hsieh .................. | C08G 73/105 524/538 |
| 2016/0280913 A1 | 9/2016 | Liu et al. | |

FOREIGN PATENT DOCUMENTS

CN 105358595 B 12/2017

* cited by examiner

*Primary Examiner* — Kregg T Brooks
(74) *Attorney, Agent, or Firm* — Christensen, Fonder, Dardi & Herbert PLLC

(57) ABSTRACT

A resin composition is provided. The resin composition comprises:

(A) a compound having a structure of formula (I),

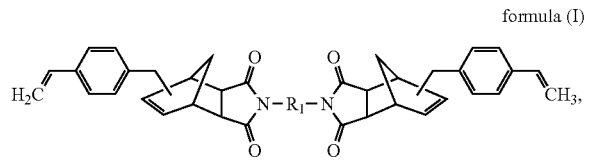

formula (I)

wherein $R_1$ is an organic group; and
(B) a vinyl-containing elastomer,
wherein the weight ratio of the compound having the structure of formula (I) to the vinyl-containing elastomer is 20:1 to 1:1.

14 Claims, No Drawings

RESIN COMPOSITION, AND PRE-PREG, METAL-CLAD LAMINATE, AND PRINTED CIRCUIT BOARD PREPARED USING THE SAME

CLAIM FOR PRIORITY

This application claims the benefit of Taiwan Patent Application No. 109116305 filed on May 15, 2020, the subject matters of which are incorporated herein in their entirety by reference.

BACKGROUND OF THE INVENTION

Field of the Invention

The present invention provides a resin composition, especially a low dielectric resin composition. The resin composition of the present invention can be used in combination with reinforcing materials to constitute a composite material or prepreg. Furthermore, it can be used as a metal foil adhesive to prepare a resin-coated copper (RCC), a metal-clad laminate, a printed circuit board (PCB) and so on.

The resin composition of the present invention has excellent properties, such as good electric properties (low Dk and low Df), adhesion strength to copper foils (peeling) and heat resistance, rendering it particularly suitable for use as an electronic material in high-frequency technical fields. In particular, the electronic material of the present invention can meet the need for high-level materials in advanced applications such as fifth generation mobile networks (5G), advanced driver assistance systems (ADAS), and artificial intelligence (AI).

Descriptions of the Related Art

As a result of the development of high-frequency and high-speed transmission electronic products, miniaturization of electronic elements, and high-density wiring in substrates, there are higher demands on the requirements for the physicochemical properties of the electronic materials used. Conventional resin compositions with epoxy resin as the main component have failed to keep up with the requirements and thus are being replaced by resin compositions with polyphenylene ether (PPE) as the main component. For example, U.S. Pat. No. 6,352,782 B2 (Applicant: General Electric (GE)) discloses a thermosetting polyphenylene ether resin composition, which comprises an end capped polyphenylene ether with unsaturated groups (mPPE) and a cross-linkable unsaturated monomer compound. In this document, a polyphenylene ether composition having good high-frequency electric properties and high heat resistance is provided by using triallyl isocyanurate (TAIC) as a monomer cross-linking agent together with an acrylate capped polyphenylene ether to form a thermosetting composition. CN 105358595 B (Applicant: Panasonic Intellectual Property Management Co., Ltd.) also discloses a thermosetting resin composition suitable for use in the megahertz (MHz) to gigahertz (GHz) frequency band. The composition comprises: (A) an end capped polyphenylene ether with unsaturated groups (mPPE), and (B) a cross-linking agent having an unsaturated group and formed by divinyl benzene (DVB) and polybutadiene. In this document, the electric properties of the mPPE composition is improved by replacing the more commonly used triallyl isocyanurate (TAIC) cross-linking agent with DVB and introducing polybutadiene as a rubber polymer.

However, even though polybutadiene or styrene/butadiene copolymer materials that are commonly known as "elastomers" or "rubbers" in the industry can improve electric properties of resin composition, elastomers have compatibility problems in resin compositions, resulting in phase separation of the elastomer and varnish in the resin composition and thus deteriorated properties of board products, such as deteriorated peeling strength.

Furthermore, the PPE resin has limits in term of electric properties. If a material with lower polarity can be used in a resin composition to replace or partially replace PPE resin, the electric properties of the resin composition may be further improved to realize extremely low Dk/Df.

SUMMARY OF THE INVENTION

An objective of the present invention is to solve the compatibility problem of elastomer in a resin composition and to provide a resin composition having improved properties including good electric properties and peeling strength, especially under the premise of being suitable for use in 5G applications.

It is found that the above objective can be achieved by using a compound with a specific structure with an elastomer in a specific ratio. The resin composition of the present invention has not only good electric properties and heat resistance but also excellent adhesion strength to a copper foil.

Therefore, an objective of the present invention is to provide a resin composition, which comprises:

(A) a compound having a structure of formula (I),

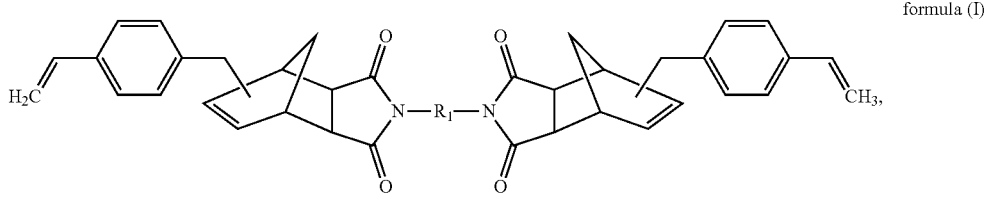

formula (I)

wherein $R_1$ is an organic group; and (B) a vinyl-containing elastomer, wherein the weight ratio of the compound having the structure of formula (I) to the vinyl-containing elastomer is 20:1 to 1:1.

In some embodiments of the present invention, the weight ratio of the compound having the structure of formula (I) to the vinyl-containing elastomer is 20:1 to 5:1.

In some embodiments of the present invention, the resin composition further comprises:

(C) a polyphenylene ether resin having an unsaturated functional group, which is represented by the following formula (II),

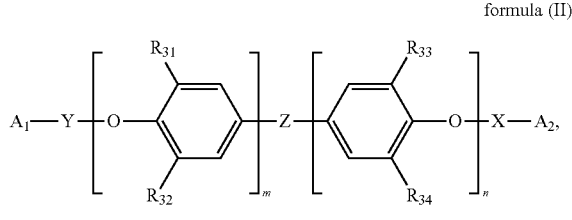

formula (II)

wherein, $R_{31}$, $R_{32}$, $R_{33}$ and $R_{34}$ are independently H, or a substituted or unsubstituted C1-C5 alkyl;

m and n are independently an integer of 0 to 100, with the proviso that m and n are not 0 at the same time;

Z is absent, or an aryl,

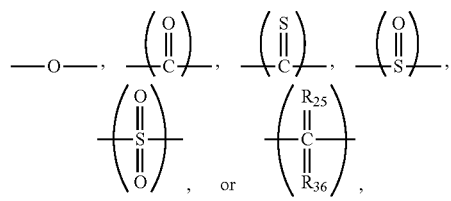

wherein $R_{35}$ and $R_{36}$ are independently H or a C1-C12 alkyl;

X and Y are independently absent, a carbonyl group, or an alkenyl-containing group; and $A_1$ and $A_2$ are independently

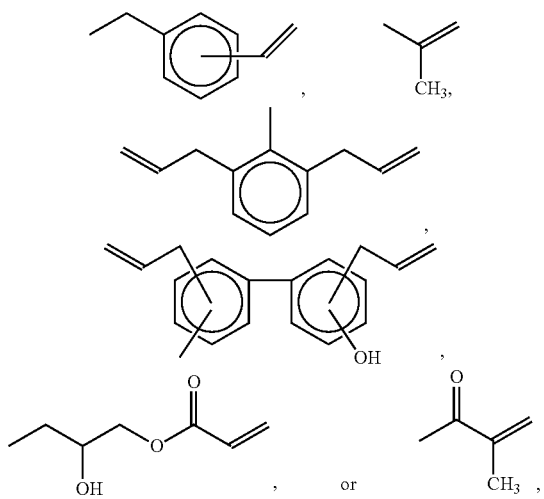

wherein the weight content of the polyphenylene ether resin having an unsaturated functional group is greater than the weight content of the vinyl-containing elastomer.

In some embodiments of the present invention, $R_1$ of formula (I) is

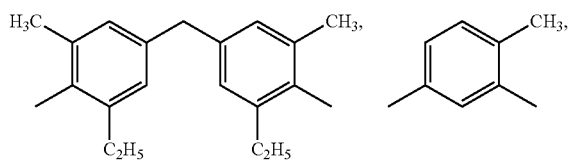

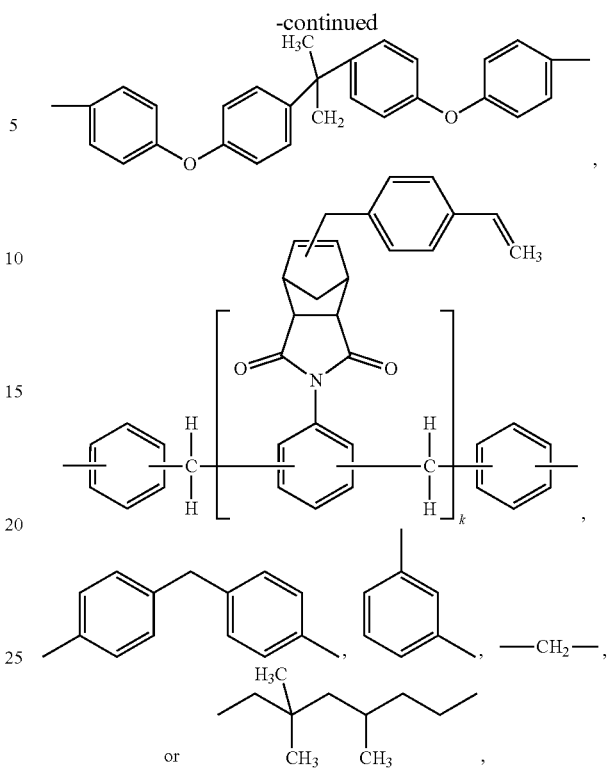

wherein k is an integer of 1 to 5.

In some embodiments of the present invention, the vinyl-containing elastomer is selected from the group consisting of polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional derivatives of the foregoing, and combinations thereof.

In some embodiments of the present invention, the resin composition further comprises a cross-linking agent selected from the group consisting of polyfunctional allylic compounds, polyfunctional acrylates, polyfunctional acrylamides, polyfunctional styrenic compounds, bismaleimide compounds, and combinations thereof.

In some embodiments of the present invention, the resin composition further comprises a flame retardant selected from the group consisting of tetrabromobisphenol A, decabromodiphenyloxide, decabrominated diphenyl ethane, 1,2-bis(tribromophenyl) ethane, brominated epoxy oligomers, octabromotrimethylphenyl indane, bis(2,3-dibromopropyl ether), tris(tribromophenyl)triazine, brominated aliphatic hydrocarbons, brominated aromatic hydrocarbons, phosphinates, polyphosphates, phosphonium salts, phosphate esters, phosphazenes, phosphite esters, phosphine oxides, and combinations thereof.

In some embodiments of the present invention, the resin composition further comprises a free radical initiator.

In some embodiments of the present invention, the resin composition further comprises a filler selected from the group consisting of silica (such as spherical, fused, non-fused, porous or hollow silica), aluminum oxide, aluminum hydroxide, magnesium oxide, magnesium hydroxide, calcium carbonate, talc, clay, aluminum nitride, boron nitride, silicon nitride, silicon aluminum carbide, silicon carbide, sodium carbonate, magnesium carbonate, titanium dioxide, zinc oxide, zirconium oxide, quartz, diamond powder, diamond-like powder, graphite, graphene, potassium titanate, strontium titanate, barium titanate, ceramic fiber, zinc molybdate, ammonium molybdate, zinc borate, calcium phosphate, calcined kaolin, pryan, mica, boehmite, hydrotalcite, carbon nanotube, polytetrafluoroethylene (PTFE) powder, hollow glass bead, and combinations thereof.

Another objective of the present invention is to provide a prepreg, which is prepared by impregnating a substrate with the aforementioned resin composition or by coating the aforementioned resin composition onto a substrate and drying the impregnated or coated substrate.

Yet another objective of the present invention is to provide a metal-clad laminate, which is prepared by laminating the aforementioned prepreg and a metal foil, or by coating the aforementioned resin composition onto a metal foil and drying the coated metal foil.

Yet another objective of the present invention is to provide a printed circuit board, which is prepared from the aforementioned metal-clad laminate.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, without departing from the spirit of the present invention, the present invention may be embodied in various embodiments and should not be limited to the embodiments described in the specification.

Unless it is additionally explained, the expressions "a," "the," or the like recited in the specification (especially in the appended claims) should include both the singular and the plural forms.

Unless it is additionally explained, while describing constituents in a solution, mixture or composition in the specification, the amount of each constituent is calculated based on the dry weight, i.e., regardless of the weight of the solvent.

Unless it is additionally explained, when referring to "impregnate" as a technical means in the specification, the technical means includes dipping, coating, spraying or other technical means having essentially the same function and effect.

The present invention uses a compound with a specific structure with an elastomer in a specific ratio to solve the compatibility problem of elastomer in a resin composition. The resin composition of the present invention has not only good electric properties and heat resistance but also excellent adhesion strength to a copper foil. The technical features and efficacy of the present invention are described below via some embodiments.

1. RESIN COMPOSITION

The resin composition of the present invention comprises (A) a compound having a structure of formula (I) and (B) a vinyl-containing elastomer as essential components and other optional components. The detailed descriptions for each component of the resin composition are as follows.

1.1 (A) Compound Having the Structure of Formula (I)

The compound having the structure of formula (I) is as follows:

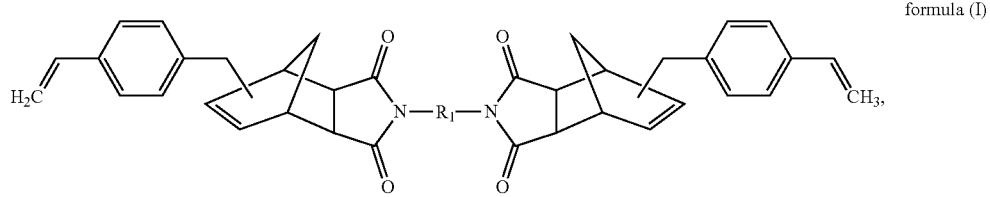

formula (I)

wherein $R_1$ is an organic group, and examples of the organic group include but are not limited to 3,3'-dimethyl-5,5'-diethyl-4,4'-diphenylmethyl (i.e.

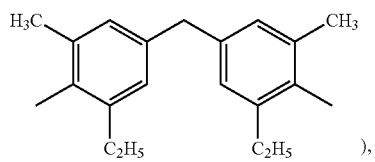), 4-methyl-1,3-phenylene (i.e.

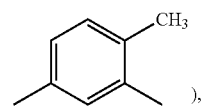), bisphenol A diphenyl ether group (i.e.

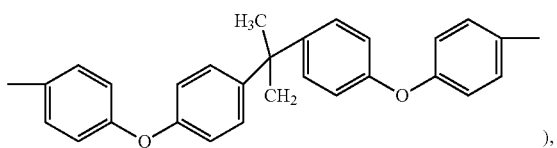),

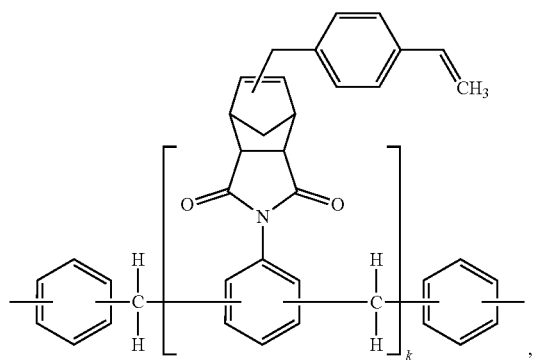

4,4'-diphenylmethyl (i.e.

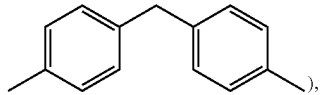), m-phenylene (i.e.

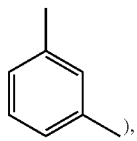), methylene (i.e. —CH$_2$—), and (2,2,4-trimethyl)hexylene (i.e.

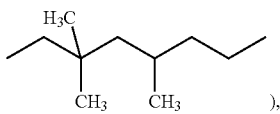), wherein k is an integer of 1 to 5.

The compound having the structure of formula (I) has a highly non-polar structure and provides good electric properties (lower Dk value and Df value) for the composition to achieve a low dielectric characteristic. In addition, since the compound has cross-linkable unsaturated functional groups (i.e. double bonds), the compound can facilitate a cross-linking reaction to achieve the goal of thermoset through conventional thermal or a peroxide catalyst mechanism. The compound can also react with any conventional cross-linking agent having unsaturated group(s), such as a vinyl-containing compound, an allyl-containing compound, and a modified PPE (such as an allyl-containing PPE).

The compound having the structure of formula (I) is a bismaleimide (BMI) derivative which is terminally vinyl modified. The derivative can be prepared by functionalizing a bismaleimide (BMI) compound. The bismaleimide compound is a compound having a structure of

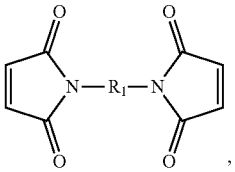

wherein R$_1$ has the definition as described above. For example, the compound having the structure of formula (I) can be prepared by the following method. First, as shown in the following chemical equation, a "vinylbenzyl (VB) (such as vinylbenzyl chloride)" is reacted with "cyclopentadiene (CPD)" to obtain 4-vinylbenzyl substituted cyclopentadiene (VB-CPD).

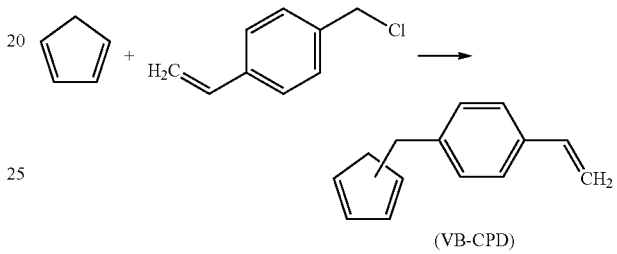

Then, VB-CPD is reacted with a bismaleimide compound to obtain a terminally vinyl-modified bismaleimide derivative having the structure of formula (I). Regarding specific examples of the preparation of the compound having the structure of formula (I), reference may be made to the Synthesis Examples provided below.

1.2. (B) Vinyl-Containing Elastomer

The vinyl-containing elastomer can be understood as a cross-linkable plasticizer. The double bonds of the vinyl of the elastomer can be reacted with the unsaturated functional groups in the resin composition to form bonds, thereby making the electronic materials prepared by curing the resin composition to have improved toughness and lower Dk and Df.

In general, a vinyl-containing elastomer is formed by the polymerization of monomers having carbon-carbon unsaturated bonds, and the main chain, branch or terminal group of the polymer has pendant vinyl group(s). The pendant vinyl content is usually expressed as a molar percentage based on the total moles of vinyl, and is preferably greater than 10 mol %, and more preferably greater than 50 mol %, such as 55 mol %, 60 mol %, 65 mol % or 70 mol %.

The vinyl-containing elastomer may be, for example, a homopolymer of conjugated-diene monomers or a copolymer of a conjugated-diene monomers and other monomer(s), wherein the copolymer may be a random copolymer or a block copolymer. In addition, the vinyl-containing elastomer can be liquid or solid under room temperature and can have a weight average molecular weight (Mw) of 200 to 100,000, preferably 1000 to 5000, and more preferably 1000 to 3000, such as 1500, 2000 or 2500. Examples of the conjugated-diene monomer include butadiene and isoprene, and examples of the other monomer include styrene and maleic anhydride.

Examples of the vinyl-containing elastomer include but are not limited to polybutadiene, styrene-butadiene copolymer (including random copolymer and block copolymer), styrene-butadiene-divinylbenzene copolymer, polyisoprene, styrene-isoprene copolymer (including random copolymer and block copolymer), acrylonitrile-butadiene copolymer, acrylonitrile-butadiene-styrene copolymer (such as block copolymer), functional derivatives of the foregoing, and combinations thereof. Each of the vinyl-containing elastomers can either be used alone or in any combination.

Commercially available vinyl-containing elastomers include Ricon 100, Ricon 181, Ricon 184, Ricon 104H, Ricon 250, Ricon 257, Ricon 157, Ricon 130, Ricon 130MA (modified with maleic anhydride) and Ricon 184MA (modified with maleic anhydride) available from Cray Valley company, B3000 available from Nippon Soda company, and Kraton DX1300 available from Shell Oil company.

According to the present invention, the vinyl-containing elastomer must be used under specific proportion. If the content of the vinyl-containing elastomer is too high, the compatibility between the elastomer and the compound having the structure of formula (I) becomes worse, resulting in phase separation in the composition. On the other hand, if the content of vinyl-containing elastomer is too low, the effect of the elastomer as a plasticizer is insufficient, and the electric properties of the resin composition cannot be improved (i.e., Dk and Df cannot be lowered). In some embodiments of the present invention, the weight ratio of the compound having the structure of formula (I) to the vinyl-containing elastomer (A:B) is preferably 20:1 to 5:1, such as 20:1, 19:1, 18:1, 17:1, 16:1, 15:1, 14:1, 13:1, 12:1, 11:1, 10:1, 9:1, 8:1, 7:1, 6:1 and 5:1. In some embodiments of the present invention, the resin composition comprises a polyphenylene ether resin (C) that will be described below and has an unsaturated functional group, and the weight content of the polyphenylene ether resin having an unsaturated functional group is greater than the weight content of the vinyl-containing elastomer, and the weight ratio of the compound having the structure of formula (I) to the vinyl-containing elastomer (A:B) is 20:1 to 1:1, such as 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 11:4, 2:1, 3:2, 1:1.

1.3. Other Optional Components

The resin composition of the present invention may, depending on the need, further comprise other optional components, such as a polyphenylene ether resin having an unsaturated functional group, cross-linking agents, flame retardants, free radical initiators, and fillers that are illustrated below, as well as additives known to persons having ordinary skill in the art, to adaptively improve the workability of the resin composition during manufacturing or the physicochemical properties of the electronic material prepared from the resin composition. The additives known to persons having ordinary skill in the art include but are not limited to polymerization initiators and curing accelerators.

1.3.1 (C) Polyphenylene Ether Resin Having an Unsaturated Functional Group

As used herein, a polyphenylene ether resin refers to a resin having at least a repeating unit

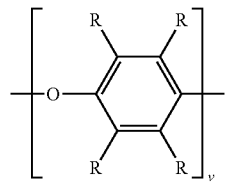

in the main chain and having an unsaturated functional group at the terminal, wherein Rs are independently H or a C1-C5 alkyl, and v is an integer ranging from 1 to 100. The unsaturated functional group refers to a group capable of carrying out addition polymerization with other components having an unsaturated functional group, and the addition polymerization can be initiated by light or heat in the presence of a polymerization initiator. Examples of the unsaturated functional group include but are not limited to vinyl, vinyl benzyl, allyl, acryloyl, an acrylate group and a methacrylate group. Examples of the polyphenylene ether resin having an unsaturated functional group include but are not limited to a vinyl-containing polyphenylene ether resin, an allyl-containing polyphenylene ether resin, a vinyl benzyl-containing polyphenylene ether resin, an acryloyl-containing polyphenylene ether resin, an acrylate group-containing polyphenylene ether resin and a methacrylate group-containing polyphenylene ether resin. Each polyphenylene ether resin having an unsaturated functional group can either be used alone or in any combination.

The method for preparing the polyphenylene ether resin having an unsaturated functional group is not the technical feature of the present invention, and persons having ordinary skill in the art can conduct the method based on the disclosure of the present specification and general knowledge. Thus, the method for preparing the polyphenylene ether resin with unsaturated end groups will not be described in detail herein. The related methods for preparing the polyphenylene ether resin with unsaturated end groups are described in, for example, U.S. Pat. No. 6,995,195 B2 (preparation of vinylbenzyl-containing polyphenylene ether resin), U.S. Pat. No. 5,218,030 A (preparation of allyl-containing polyphenylene ether resin), U.S. Pat. No. 5,352,745 A (preparation of (meth)acrylate group-containing polyphenylene ether resin), U.S. Pat. No. 6,352,782 B2 (preparation of polyphenylene ether resin having an unsaturated functional group), and US 2016/0280913 A1 (preparation of polyphenylene ether resin having an unsaturated functional group), all of which are incorporated herein in their entireties by reference.

A preferred embodiment of the polyphenylene ether resin having an unsaturated functional group is represented by the following formula (II):

formula (II)

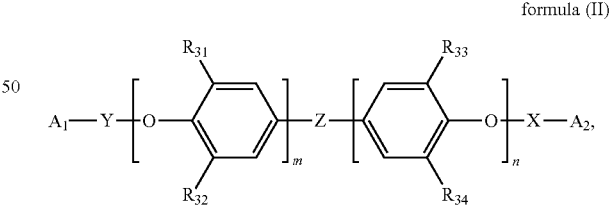

in formula (II), $R_{31}$, $R_{32}$, $R_{33}$ and $R_{34}$ are independently H, or a substituted or unsubstituted C1-C5 alkyl; m and n are independently an integer of 0 to 100, with the proviso that m and n are not 0 at the same time; Z is absent, or an aryl,

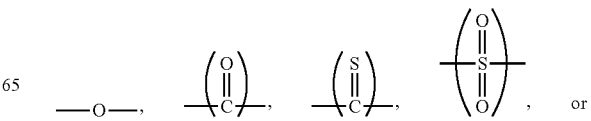

or

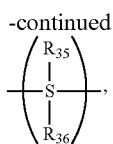

wherein $R_{35}$ and $R_{36}$ are independently H or a C1-C12 alkyl; X and Y are independently absent, a carbonyl group, or an alkenyl-containing group; and $A_1$ and $A_2$ are independently

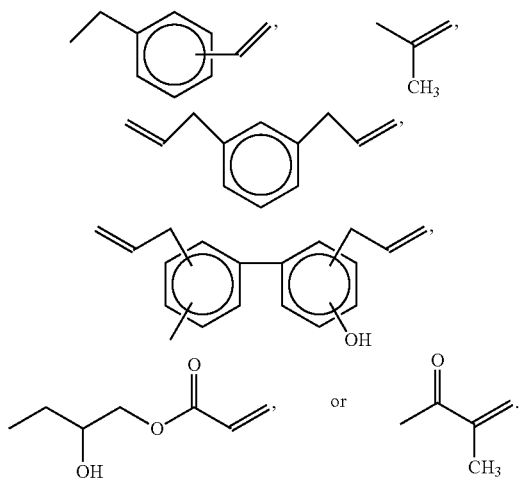

In the resin composition of the present invention, the polyphenylene ether resin (C) having an unsaturated functional group may have a weight average molecular weight (Mw) of 1000 to 50,000, preferably 1000 to 10,000, and more preferably 1000 to 5000, such as 1500, 2000, 2500, 3000, 3500, 4000, or 4500. If the molecular weight of the polyphenylene ether resin is above the aforementioned range, the properties of the resin composition, such as fluidity, solubility, etc., may deteriorate, which makes it difficult for subsequent processing. On the other hand, if the molecular weight of the polyphenylene ether resin is below the aforementioned range, the electric properties and thermal stability of the resin composition may deteriorate.

Examples of commercially available polyphenylene ether resin having an unsaturated functional group include OPE-2st and OPE-2EA available from Mitsubishi Gas Chemical, SA-9000 available from Sabic, PPE products available from Asahi, and polyphenylene ether resin products available from Chin Yee Chemical Industry company.

In some embodiments of the present invention, the polyphenylene ether resin having an unsaturated functional group can improve the compatibility of the vinyl-containing elastomer in the resin composition. In particular, when the amount of the polyphenylene ether resin having an unsaturated functional group is greater than the amount of the vinyl-containing elastomer, the weight ratio of the compound having the structure of formula (I) to the vinyl-containing elastomer can be from 20:1 to 1:1, meaning that the amount of elastomer can be significantly increased.

1.3.2. Cross-Linking Agent

The resin composition of the present invention may further comprise a cross-linking agent. As used herein, a cross-linking agent refers to a component having an unsaturated functional group (including a double bond or triple bond) and being capable of undergoing a cross-linking reaction with the aforementioned compound having the structure of formula (I), the vinyl-containing elastomer and the optional polyphenylene ether resin having an unsaturated functional group to form a steric network structure. The type of the cross-linking agent is not particularly limited but preferably will have good compatibility with all of the compound having the structure of formula (I), the vinyl-containing elastomer and the optional polyphenylene ether resin having an unsaturated functional group. Unsaturated functional cross-linking agents may include monofunctional cross-linking agents (having only one unsaturated functional group in single molecule) and polyfunctional cross-linking agents (having two or more unsaturated functional groups in single molecule). In the present invention, it is preferable to use a polyfunctional cross-linking agent so that the composition would have a higher cross-linking density after curing.

Examples of the polyfunctional cross-linking agents include but are not limited to polyfunctional allyl compounds, polyfunctional acrylate compounds, polyfunctional acrylamide compounds, polyfunctional styrene compounds, and bismaleimide compounds. Each of the aforementioned polyfunctional cross-linking agents can either be used alone or in any combination.

A polyfunctional allyl compound refers to a compound containing at least two allyl groups. Examples of the polyfunctional allyl compound include but are not limited to diallyl phthalate, diallyl isophthalate, triallyl trimellitate, triallyl mesate, triallyl isocyanurate (TAIC), triallyl cyanurate (TAC), and prepolymers thereof.

A polyfunctional acrylate compound refers to a compound containing at least two acrylate groups. Examples of the polyfunctional acrylate compound include but are not limited to trimethylolpropane tri(meth)acrylate, 1,6-hexanediol di(meth)acrylate, ethylene glycol di(meth)acrylate, propylene glycol di(meth)acrylate, 1,3-butanediol di(m eth)acrylate, 1,4-butanediol di(meth)acrylate, cyclohexane dimethanol di(meth)acrylate, diethylene glycol di(meth)acrylate, triethylene glycol di(meth)acrylate, and prepolymers thereof.

A polyfunctional styrene compound refers to a compound having at least two alkenyl groups attached to any aromatic ring. Examples of the polyfunctional styrene compound include but are not limited to 1,3-divinylbenzene, 1,4-divinylbenzene, trivinylbenzene, 1,3-diisopropenylbenzene, 1,4-diisopropenylbenzene, 1,2-bis(p-vinylphenyl)ethane, 1,2-bis(m-vinylphenyl)ethane, 1-(p-vinylphenyl)-2-(m-vinylphenyl)-ethane, 1,4-bis(p-vinylphenylethyl)benzene, 1,4-bis(m-vinylphenylethyl)benzene, 1,3-bis(p-vinylphenylethyl)benzene, 1,3-bis(m-vinylphenylethyl)benzene, 1-(p-vinylphenylethyl)-4-(m-vinylphenylethyl) benzene, 1-(p-vinylphenylethyl)-3-(m-vinylphenylethyl)benzene, and prepolymers thereof.

The bismaleimide compound is as defined above, and the aforementioned bismaleimide compounds used to prepare the compound having the structure of formula (I) can also be used as polyfunctional cross-linking agents. Examples of the bismaleimide compound include but are not limited to 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenyl ether, 3,3'-bismaleimidodiphenyl sulfone, 4,4'-bismaleimidodiphenyl sulfone, 4,4'-bismaleimidodicyclohexylmethane, 3,5-bis(4-maleimidophenyl) pyridine, 2,6-bismaleimidopyridine, 1,3-bis(maleimidomethyl)cylcohexane, 1,3-bis(maleimidomethyl)benzene, 1,1-bis(4-maleimidophenyl)cyclohexane, 1,3-bis(dichloromaleimido)benzene, 4,4'- biscitraconimidodiphenylmethane, 2,2-bis(4-maleimidophenyl)propane, 1-phenyl-1,1-bis(4-maleimidophenyl)ethane, α,α-bis(4-maleimidophenyl) toluene, 3,5-bismaleimido-1,2,4-triazole, N,N'-ethylenebismaleimide, N,N'-hexamethylenebismaleimide, N,N'-m-phenylenebismaleimide, N,N'-p-phenylenebismaleimide, N,N'-(4,4'-diphenylmethane)bismaleimide, N,N'-(4,4'-diphenyl ether) bismaleimide, N,N'-(4,4'-diphenylsulfone) bismaleimide, N,N'-(4,4'-dicyclohexylmethane) bismaleimide, N,N'-α,α'-4,4'-dimethylene cyclohexane bismaleimide, N,N'-m-dimethylphenylbismaleimide, N,N'-(4,4'-diphenylcyclohexane)bismaleimide, N,N'-methylene bis (3-chloro-p-phenylene)bismaleimide, and 3,3'-dimethyl-5,5'-diethyl-4,4'-diphenylmethyl bismaleimide. Commercially available bismaleimide compounds include, for example, BMI-70, BMI-80 available from KI Chemical, and BMI-1000, BMI-4000, BMI-5000, BMI-5100, BMI-7000, BMI-2000, BMI-2300 (CAS No. 67784-74-1) available from Yamato Chemical.

Among the aforementioned various unsaturated functional cross-linking agents, the following compounds are preferred: polyfunctional allyl compounds, such as triallyl isocyanurate and triallyl cyanurate; polyfunctional styrene compounds, such as 1,3-divinylbenzene, 1,4-divinylbenzene, 1,2-bis(p-vinylphenyl)ethane, 1,2-bis(m-vinylphenyl) ethane, 1-(p-vinylphenyl)-2-(m-vinylphenyl)-ethane; bismaleimide compounds, such as 3,3'-dimethyl-5,5'-diethyl-4,4'-diphenylmethyl bismaleimide; and combinations of two or more of the foregoing unsaturated functional cross-linking agents.

In the resin composition of the present invention, the weight average molecular weight (Mw) of the cross-linking agent is preferably 100 to 5000, more preferably 100 to 4000, and the most preferably 100 to 3000, such as 1500, 2000 or 2500. If the molecular weight of the cross-linking agent is lower than the aforementioned ranges, the cross-linking agent is prone to evaporate during the curing process of the resin composition, thereby affecting the constitution of the composition. On the other hand, if the molecular weight of the cross-linking agent is higher than the aforementioned ranges, the viscosity of the composition would be too high, thereby affecting the workability of the composition.

In the preferred embodiments of the present invention, triallyl isocyanurate and 3,3'-dimethyl-5,5'-diethyl-4,4'-diphenylmethyl bismaleimide are used as the cross-linking agent.

1.3.3. Flame Retardant

The resin composition of the present invention may optionally further comprise a flame retardant to improve the flame retardance of the electronic materials produced therefrom. The flame retardant can be a halogen-containing flame retardant or a halogen-free flame retardant. A halogen-free flame retardant is eco-friendly and therefore is the preferred flame retardant.

Common halogen-containing flame retardants include bromine-containing flame retardants. Examples of the bromine-containing flame retardant include but are not limited to tetrabromobisphenol A, decabromodiphenyloxide, decabrominated diphenyl ethane, 1,2-bis(tribromophenyl) ethane, 1,2-bis(tetrabromophthalimido) ethane, brominated epoxy oligomer, octabromotrimethylphenyl indane, bis(2,3-dibromopropyl ether), tris(tribromophenyl) triazine, brominated aliphatic hydrocarbon, and brominated aromatic hydrocarbon.

Examples of the halogen-free flame retardant include but are not limited to nitrogen-containing flame retardants and phosphorous-containing flame retardants. Examples of the nitrogen-containing flame retardant include but are not limited to melamine and derivatives thereof, and Melapur 200, which is available from the BASF company, is a commercially available product of the nitrogen-containing flame retardant. Examples of the phosphorous-containing flame retardant include but are not limited to phosphinate, polyphosphate, phosphonium salt, phosphate ester, phosphazene, phosphite ester, and phosphine oxide.

Examples of the phosphinate include but are not limited to aluminum dialkylphosphinate, aluminum tris(diethylphosphinate), aluminum tris(methylethylphosphinate), aluminum tris(diphenylphosphinate), zinc bis(diethylphosphinate), zinc bis(methylethylphosphinate), zinc bis(diphenylphosphinate), titanyl bis(diethylphosphinate), titanyl bis(methylethylphosphinate), and titanyl bis(diphenylphosphinate). One commercially available phosphinate is OP-935 which is available from the CLAMANT company.

Examples of the polyphosphate include but are not limited to melamine polyphosphate, melam polyphosphate, and melem polyphosphate. One commercially available polyphosphate is Melapur 200 available from the BASF company.

Examples of the phosphonium salt include but are not limited to tetraphenylphosphonium tetraphenylborate. Examples of the phosphate ester include but are not limited to a condensed phosphate ester compound and a cyclic phosphate ester compound. Examples of the condensed phosphate ester compound include but are not limited to triphenyl phosphate, tricresyl phosphate, xylenyl-diphenyl phosphate, cresyl-diphenyl phosphate, resorcinol bis-xylenylphosphate (RXP), resorcinol bis-diphenylphosphate (RDP), and 9,10-dihydro-9-oxa-10-phosphaphenanthrene-10-oxide (DOPO). Commercially available phosphate esters include PX-200 and PX-202 available from Daihachi Chemical Industry company, and CG-686 and CG-RDP available from Chembridge company.

The phosphazene can be a cyclic phosphazene compound or a linear phosphazene compound. Commercially available phosphazenes include BP-PZ, SPB-100, and SPH-100, each of which is available from Otsuka Chemical company. Examples of the phosphite ester include but are not limited to trimethylphosphite and triethylphosphite.

Examples of the phosphine oxide include but are not limited to tris-(4-methoxyphenyl) phosphine oxide, triphenyl phosphine oxide, diphenyl phosphine oxide, and derivatives thereof. Commercially available phosphine oxides include PQ-60, which is available from the Chin Yee Chemical Industry company, and BPO-13 and BPE-3, which are available from the Katayama Chemical Industries company.

Each of the aforementioned flame retardants can either be used alone or in any combination. In the appended Examples, 1,2-bis(tetrabromophthalimido) ethane is used as the flame retardant.

1.3.4. Free Radical Initiator

Although the resin composition of the present invention can be cured directly at an elevated temperature, a free radical initiator may also be used to facilitate curing reaction. In particular, when the resin composition comprises a polyphenylene ether resin having an unsaturated functional group, a free radical initiator may be additionally added.

Examples of free radical initiators include but are not limited to azobisisobutyronitrile, azobis(2-isopropyl)butyronitrile, azobisisoheptonitrile, dibenzoyl peroxide, acetylisobutyryl peroxide, diacetyl peroxide, 2,4-dichlorobenzoyl peroxide, 2-dimethylbenzoyl peroxide, lauroyl peroxide, diisopropyl peroxydicarbonate, bis(3,5,5-trimethylhexanoyl) peroxide, cyclohexanone peroxide, methyl ethyl ketone peroxide, dicyclohexylpropyl peroxydicarbonate, dicyclohexyl peroxydicarbonate, bis(4-tert-butylcyclohexyl) peroxydicarbonate, bis(2-ethylhexyl) peroxydicarbonate, bis(2-phenylethoxy) peroxydicarbonate, dihexadecyl peroxydicarbonate, tert-butyl peroxybenzoate, tert-butyl peroxyphenylacetate, peracetic acid, tert-butyl peroxypivalate, tert-hexyl peroxypivalate, cumyl peroxyneodecanoate, tert-butyl hydroperoxide, cumene hydroperoxide, p-menthane hydroperoxide, ditert-butyl peroxide, dicumyl peroxide, hydrogen peroxide, ammonium persulfate, potassium persulfate, peroxide-alkyl metal, and oxyalkyl metal. Commercially available free radical initiators include Perbutyl P, Perhexa 25B, and Perhexi 25B which are available from the Nippon Oil & Fats Company.

In general, the content of the free radical initiator can be 0.01 to 3 wt % based on the solid content of the resin composition, but the present invention is not limited thereto. Persons having ordinary skill in the art can adjust the content depending on their needs.

1.3.5. Filler

The resin composition of the present invention may optionally further comprise a filler to lower the coefficient of thermal expansion of the resin composition (to improve dimensional stability) and improve such as thermal conductivity and mechanical strength of the resin composition. Examples of fillers include but are not limited to silica (such as spherical, fused, non-fused, porous, hollow, or nanosized silica), aluminum oxide, aluminum hydroxide, magnesium oxide, magnesium hydroxide, calcium carbonate, talc, clay, aluminum nitride, boron nitride, silicon nitride, silicon aluminum carbide, silicon carbide, sodium carbonate, magnesium carbonate, titanium dioxide, zinc oxide, zirconium oxide, quartz, diamond powder, diamond-like powder, graphite, graphene, potassium titanate, strontium titanate, barium titanate, ceramic fiber, zinc molybdate, ammonium molybdate, zinc borate, calcium phosphate, calcined kaolin, pryan, mica, boehmite, hydrotalcite, carbon nanotube, polytetrafluoroethylene (PTFE) powder, hollow glass bead, and nanosized inorganic powder. Each of the aforementioned fillers can either be used alone or in any combination. Commercially available fillers include, for example, silica products of Admafuse, Admafine, Admanano series and surface-treated products of SC1050, SC2050, SC4050, SC5500, SE2050 available from Admatechs company.

In general, the content of the fillers can be 0 to 60 wt % based on the solid content of the resin composition but is not limited thereto. Persons having ordinary skill in the art can adjust the content of the filler depending on their needs.

To improve the filling effect of using the filler and the quality of the resulting composition, the average particle size of the filler used should be small. Specifically, the average particle size of the filler may be less than 10 μm, preferably less than 5 μm, and more preferably less than 2.5 μm. To improve the compatibility of the filler with other components of the resin composition and the workability of the resin composition, the filler is preferably surface modified with a coupling agent before being added into the resin composition.

Examples of coupling agents include but are not limited to silane coupling agent, titanate coupling agent, zirconate coupling agent, poly-siloxane coupling agent, and functionalized coupling agents, wherein common functionalized coupling agents include but are not limited to epoxy-silane, amino-silane, vinyl-silane, and acrylic silane. Considering that the resin composition of the present invention may further comprise a polyphenylene ether resin having an unsaturated functional group, the coupling agent is preferably vinyl-silane which can react with polyphenylene ether, such as vinyl trimethoxy silane and vinyl triethoxy silane. The detailed description of the surface-modification method of the filler can be also found in U.S. Pat. No. 6,524,717 (Applicant: Hitachi Chemical), the content of which is incorporated herein in its entirety by reference.

1.4. Preparation of Resin Composition

The resin composition of the present invention may be prepared for subsequent applications by evenly mixing the compound (A) having the structure of formula (I), the vinyl-containing elastomer (B), an optional polyphenylene ether resin (C) having an unsaturated functional group, and other optional components through a stirrer, and dissolving or dispersing the obtained mixture into a solvent. The solvent here can be any inert solvent that can dissolve or disperse the components of the resin composition of the present invention but does not react with the components of the resin composition. Examples of the solvent that can dissolve or disperse the components of the resin composition include but are not limited to toluene, γ-butyrolactone, methyl ethyl ketone (MEK), cyclohexanone, butanone, acetone, xylene, methyl isobutyl ketone, N,N-dimethylformamide (DMF), N,N-dimethylacetamide (DMAc), and N-methylpyrolidone (NMP). Each of the aforementioned solvents can either be used alone or in combination. The amount of the solvent is not particularly limited as long as the components of the resin composition can be dissolved or evenly dispersed therein. In some embodiments of the present invention, methyl ethyl ketone is used as the solvent.

2. PREPREG

The present invention also provides a prepreg prepared from the aforementioned resin composition, wherein the prepreg is prepared by impregnating a substrate with the aforementioned resin composition or by coating the aforementioned resin composition onto a substrate, and thermal drying the impregnated or coated substrate to obtain a semi-cured (B-stage) prepreg. The method for preparing the prepreg is not particularly limited and can be easily accomplished by persons having ordinary skill in the art based on the disclosure of the subject specification and their ordinary skill. Specifically, the method for impregnating or coating resin compositions include but are limited to impregnating, roll coating, die coating, bar coating, and spraying. The impregnated or coated substrate can be dried at a temperature of 80° C. to 180° C. for 1 to 10 minutes to obtain a semi-cured (B-stage) prepreg.

As used herein, the substrate can also be referred to as a reinforcement, which can be an organic or inorganic material. Examples of the substrate include but are not limited to woven fabrics, non-woven fabrics, glass roving cloths, glass cloths, chopped glass fibers, hollow glass fibers, glass mats, glass surfacing mats, non-woven glass fabrics, and ceramic fiber fabrics. Examples of the raw material that can be used to form the substrate include but are not limited to E-glass fiber, NE-glass fiber, S-glass fiber, L-glass fiber, T-glass fiber, D-glass fiber, quartz, aramid, and liquid crystal polymer. Considering the dielectric properties of the prepared electronic material, it is preferred to use a substrate having a low Df value, such as a substrate composed of E-glass fiber, NE-glass fiber, S-glass fiber, and L-glass fiber.

3. METAL-CLAD LAMINATE AND PRINTED CIRCUIT BOARD

The present invention also provides a metal-clad laminate prepared from the aforementioned prepreg, which comprises a dielectric layer and a metal layer. The metal-clad laminate can be prepared by laminating the aforementioned prepreg with a metal foil, or by coating the aforementioned resin composition onto a metal foil and drying the coated metal foil. In the case of the preparation of the metal-clad laminate by using the prepreg, the metal-clad laminate can be prepared by superimposing a plurality of the aforementioned prepregs, superimposing a metal foil (such as a copper foil) on at least one external surface of the dielectric layer composed of the superimposed prepregs to provide a superimposed object, and then performing a hot-pressing operation onto the superimposed object to obtain the metal-clad laminate.

Furthermore, the aforementioned metal-clad laminate can form a printed circuit board by further patterning the external metal foil thereof.

4. EXAMPLES

4.1. Testing Methods

The present invention is further illustrated by the embodiments hereinafter, wherein the testing instruments and methods are as follows:

[Dielectric Constant (Dk) and Dissipation Factor (Df) Measurements]

The dielectric constant (Dk) and dissipation factor (Df) of the metal-clad laminate are measured according to IPC-TM-650 2.5.5.13 under an operating frequency of 10 GHz. The resin content (RC) of the prepreg in the metal-clad laminate is 56%.

[Coefficient of Thermal Expansion Test (Z-CTE, %)]

A thermomechanical analyzer (TMA) is used to measure the coefficient of thermal expansion of the fully cured thermosetting resin composition in Z-direction (in the thickness direction of the substrate) (Z-CTE). The testing method is as follows: preparing a sample of fully cured thermosetting resin composition sized at 5 mm x5 mm x1.5 mm; setting the conditions as follows: a starting temperature of 30° C., an end temperature of 330° C., a heating rate of 10° C./min, and a load of 0.05 Newton (N); and subjecting the sample to thermomechanical analysis under the aforementioned conditions in expansion/compression mode to measure the values of thermal expansion per 1° C. in the range of 30° C. to 330° C. and then averaging the measured values. The unit of the CTE is %.

[Thermal Decomposition Temperature Test (Td, 5% Weight Loss)]

The thermal decomposition temperature test is conducted according to IPC-TM-650.2.4.24.6 testing method of the Institute for Interconnecting and Packaging Electronic Circuits by using a Thermo Gravimetric Anzlysis (TGA). The programmed heating rate is 10° C./min, and the thermal decomposition temperature (Td) was a temperature at which the weight of the sample decreased by 5% from the initial weight.

[Flame Retardance Level Test]

The flame retardance test is carried out according to UL94V (Vertical Burn), which comprises the burning of a laminate, which is held vertically, using a Bunsen burner to compare its self-extinguishing properties and combustion-supporting properties. The ranking for the flame retardance level is V0>V1>V2.

[T288 Solder Resistance Test]

A metal-clad laminate is dried and then immersed in a tin solder bath at 288° C. for at least 30 minutes to see whether there is any delamination or blistering.

[Glass Transition Temperature (Tg) Test]

The laminate for evaluation is etched to remove the copper foils thereof at both sides, and the resulting unclad laminate is subjected to a glass transition temperature (Tg) test. Specifically, a dynamic mechanical analysis (DMA) under the model number of "Q800" manufactured by TA Instruments is used to measure the Tg of the unclad laminate. The testing conditions are as follows: using bending modules, setting the frequency at 10 Hz and the heating rate at 5° C./min, and measuring the dynamic viscoelasticity during heating from room temperature to 280° C. The temperature at which the maximum tan δ is measured is Tg.

[Test of Adhesion Strength to Copper Foil]

The adhesion strength refers to the adhesion strength of the metal foil to the laminated prepreg, and in this test, it is expressed as the force required to vertically peel the copper foil with a width of ⅛ inch from the surface of the laminated prepreg. The unit of the adhesion strength is pound-force per inch (lbf/in).

[Pressure Cooker Test (PCT) Heat Resistance Test]

The soldering heat resistance after pressure cooker test (i.e. soldering heat resistance after moisture absorption) is measured according to JS C 6481 method. The sample is treated at a temperature of 121° C. and a pressure of 2 bar for 3 hours, and then the sample is immersed in a solder bath at 288° C. for 20 seconds. The immersed sample is evaluated under visual inspection to see whether there is any measling or burst. If no measling or burst is found, then the test result is recorded as "○". If measling or burst is found, then the test result is recorded as "x".

4.2. List of Raw Materials Used in Examples and Comparative Examples

| Raw materials | Description and source |
| --- | --- |
| SA9000 | Polyphenylene ether resin having an unsaturated functional group, available from Sabic. |
| Ricon 100 | Vinyl-containing elastomer, styrene-butadiene random copolymer, available from Cray Valley Company. |
| Ricon 150 | Vinyl-containing elastomer, polybutadiene, available form Cray Valley Company. |
| Ricon 257 | Vinyl-containing elastomer, styrene-butadiene-divinyl benzene terpolymer, available from Cray Valley Company. |
| Ricon 184MA6 | Vinyl-containing elastomer, maleic anhydride-modified styrene-butadiene copolymer, available from Cray Valley Company. |
| BMI 70 | Bismaleimide, available from Yamato Chemical. |
| TAIC | Triallyl isocyanurate, available from Evonik |
| 525A | $SiO_2$ filler, available from Sibelco Company. |
| Saytex BT93 | 1,2-bis(tetrabromophthalimide)ethane, available from Albemarle Company. |
| Perbutyl P | Free radical initiator, available from Nippon Oil & Fats Company. |

4.3. Synthesis Examples

4.3.1. Preparation of Terminal Modifier VB-CPD 17.5 g of sodium hydride was washed with hexane to remove mineral oil. Then, the washed sodium hydride was suspended in 350 mL hexane in a 1000 mL round-bottom flask. The flask was filled with an inert atmosphere and cooled to 5° C.

44.0 g of fresh-cracked cyclopentadiene (CPD) was added portionwise into the flask with vigorous stirring. After the addition of CPD was done, the temperature was raised to 60° C. with a reflux system. Afterward, 100 g of vinylbenzyl chloride (VB) was added portion wise into the flask.

150 g of deionized water was added with vigorous stirring for 30 minutes to obtain a biphasic mixture. Then, the organic phase of the biphasic mixture was washed with 10 wt % of aqueous HCl solution and deionized water several times.

The organic phase was separated and dried with sodium sulfate, and then subjected to rotary distillation to remove solvent to obtain 4-vinylbenzyl substituted cyclopentadiene (VB-CPD) represented by the following formula.

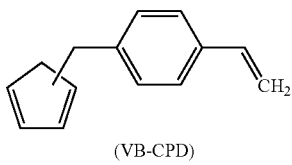

(VB-CPD)

4.3.2. Synthesis of the Compound Having the Structure of Formula (I)

Synthesis Example 1: Synthesis of S1B Compound 7.80 g of VB-CPD and 10.0 g of 3,3'-dimethyl-5,5'-diethyl-4,4'-diphenylmethanebismaleimide (i.e. a compound represented by formula S1A below) were mixed and dissolved in 20.0 g of dichloromethane solvent. The resulting homogenous solution was allowed to react at room temperature for 30 minutes, and then the dichloromethane solvent was removed by rotary evaporation at 50° C., yielding a compound represented by formula S1B below.

formula S1A

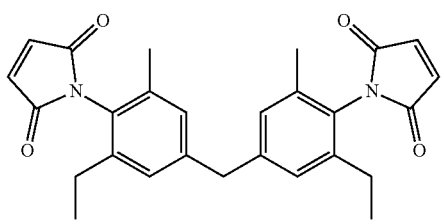

formula S1B

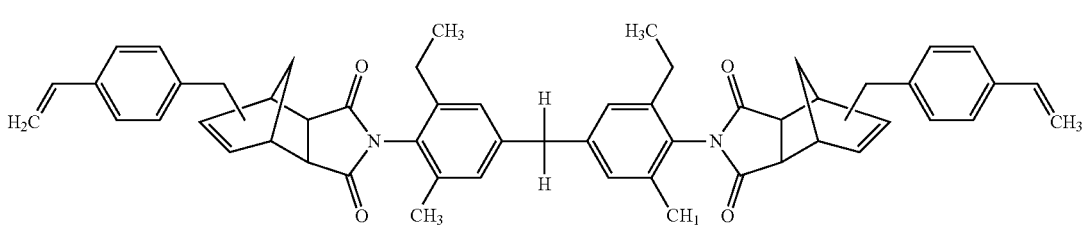

Synthesis Example 2: Synthesis of S2B Compound 12.9 g of VB-CPD and 10.0 g of 4-methyl-1,3-phenylenebismaleimide (i.e. a compound represented by formula S2A below) were mixed and dissolved in 20.0 g of dichloromethane solvent. The resulting homogenous solution was allowed to react at room temperature for 30 minutes, and then the dichloromethane solvent was removed by rotary evaporation at 50° C., yielding a compound represented by formula S2B below.

formula S2A

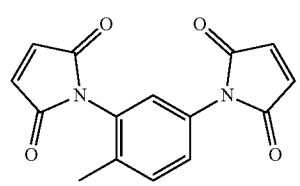

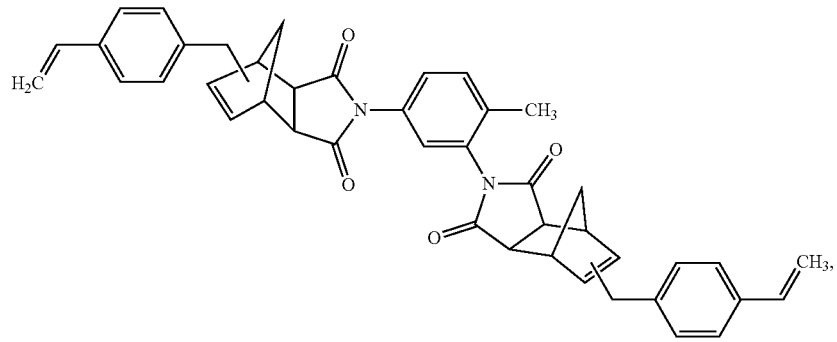

formula S2B

Synthesis Example 3: Synthesis of S3B Compound 6.50 g of VB-CPD and 10.0 g of bisphenol A diphenyl ether bismaleimide (i.e. a compound represented by formula S3A below) were mixed and dissolved in 20.0 g of dichloromethane solvent. The resulting homogenous solution was allowed to react at room temperature for 30 minutes, and then the dichloromethane solvent was removed by rotary evaporation at 50° C., yielding a compound represented by formula S3B below.

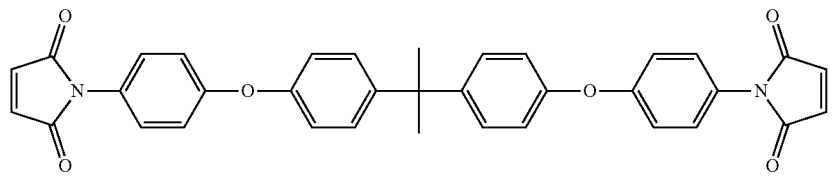

formula S3A

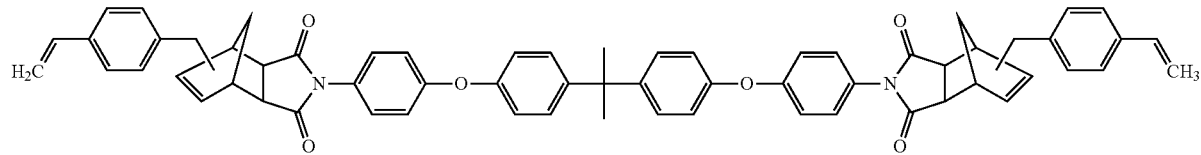

formula S3B

Synthesis Example 4: Synthesis of S4B Compound 10.0 g of VB-CPD and 10.0 g of a compound represented by formula S4A below were mixed and dissolved in 20.0 g of dichloromethane solvent. The resulting homogenous solution was allowed to react at room temperature for 30 minutes, and then the dichloromethane solvent was removed by rotary evaporation at 50° C., yielding a compound represented by formula S4B below. In formula S4A and S4B, k is an integer of 1 to 5.

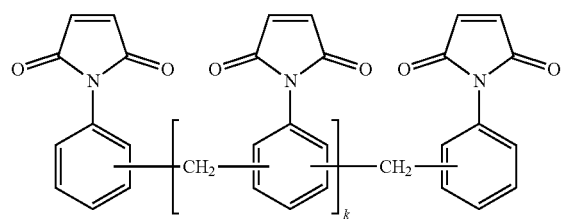

formula S4A

-continued formula S4B

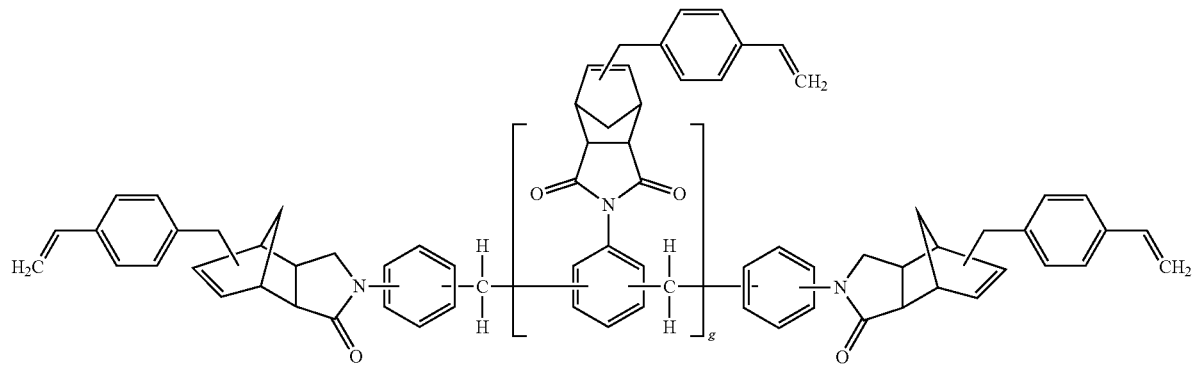

4.4. Preparation of the Resin Composition

Based on the components and proportions shown in Table 1 to Table 4, the components were sufficiently mixed using a stirrer at room temperature for 120 minutes to obtain resin compositions of Examples E1 to E5 and Comparative Examples C1 to C8. Furthermore, the resin compositions were observed to see whether phase separation occurs or not, and the results were recorded in Table 1 to Table 4.

TABLE 1

Proportions of the resin compositions of Examples E1 to E6

| Components (parts by weight) | | E1 | E2 | E3 | E4 | E5 | E6 |
|---|---|---|---|---|---|---|---|
| Polyphenylene ether | SA9000 | | | | | | |
| Compound having the structure of formula (I) | S1B | 60 | 60 | 60 | | | |
| | S2B | | | | 60 | | |
| | S3B | | | | | 60 | |
| | S4B | | | | | | 60 |
| Elastomer | Ricon 100 | 12 | 6 | 3 | 12 | 12 | 12 |
| | Ricon 150 | | | | | | |
| | Ricon 257 | | | | | | |
| | Ricon 184MA6 | | | | | | |
| Cross-linking agent | BMI-70 | 26 | 29 | 30 | 26 | 26 | 26 |
| | TAIC | 22 | 25 | 26 | 22 | 22 | 22 |
| Filler | 525A | 60 | 60 | 60 | 60 | 60 | 60 |
| Flame retardant | BT93 | 15 | 15 | 15 | 15 | 15 | 15 |
| | Perbutyl-P | 0.2 | 0.2 | 0.2 | 0.2 | 0.2 | 0.2 |
| | MEK | 120 | 120 | 120 | 120 | 120 | 120 |
| Phase separation in the resin composition | | No | No | No | No | No | No |

TABLE 2

Proportions of resin compositions of Comparative Examples C1 to C5

| Components (parts by weight) | | C1 | C2 | C3 | C4 | C5 |
|---|---|---|---|---|---|---|
| Polyphenylene ether | SA9000 | | | | | |
| Compound having the structure of formula (I) | S1B | 60 | 60 | | | |
| | S2B | | | 60 | | |
| | S3B | | | | 60 | |
| | S4B | | | | | 60 |
| Elastomer | Ricon 100 | 25 | 18 | 25 | 25 | 25 |
| | Ricon 150 | | | | | |
| | Ricon 257 | | | | | |
| | Ricon 184MA6 | | | | | |
| Cross-linking agent | BMI-70 | 20 | 23 | 20 | 20 | 20 |
| | TAIC | 15 | 19 | 15 | 15 | 15 |
| Filler | 525A | 60 | 60 | 60 | 60 | 60 |
| Flame retardant | BT93 | 15 | 15 | 15 | 15 | 15 |
| | Perbutyl-P | 0.2 | 0.2 | 0.2 | 0.2 | 0.2 |
| | MEK | 120 | 120 | 120 | 120 | 120 |
| Phase separation in the resin composition | | Yes | Yes | Yes | Yes | Yes |

TABLE 3

Proportions of resin compositions of Examples E7 to E10 and Comparative Example C6

| Components (parts by weight) | | E7 | E8 | E9 | E10 | C6 |
|---|---|---|---|---|---|---|
| Polyphenylene ether | SA9000 | 15 | 15 | 15 | 15 | 15 |
| Compound having the structure of formula (I) | S1B | 45 | 45 | 45 | 45 | 45 |
| | S2B | | | | | |
| | S3B | | | | | |
| | S4B | | | | | |
| Elastomer | Ricon 100 | 9 | | | | 25 |
| | Ricon 150 | | 9 | | | |
| | Ricon 257 | | | 9 | | |
| | Ricon 184MA6 | | | | 9 | |
| Cross-linking agent | BMI-70 | 25 | 25 | 25 | 25 | 20 |
| | TAIC | 25 | 25 | 25 | 25 | 15 |
| Filler | 525A | 60 | 60 | 60 | 60 | 60 |
| Flame retardant | BT93 | 15 | 15 | 15 | 15 | 15 |
| | Perbutyl-P | 0.2 | 0.2 | 0.2 | 0.2 | 0.2 |
| | MEK | 120 | 120 | 120 | 120 | 120 |
| Phase separation in the resin composition | | No | No | No | No | Yes |

TABLE 4

Proportions of resin compositions of Examples E11 to E15 and Comparative Examples C7 and C8

| Components (parts by weight) | | E11 | E12 | E13 | E14 | E15 | C7 | C8 |
|---|---|---|---|---|---|---|---|---|
| Polyphenylene ether | SA9000 | 11 | 20 | 22 | 27 | 34 | 15 | 30 |
| Compound having the structure of formula (I) | S1B | 49 | 44 | 38 | 33 | 26 | 45 | 30 |
| | S2B | | | | | | | |
| | S3B | | | | | | | |
| | S4B | | | | | | | |
| Elastomer | Ricon 100 | 7 | 16 | 16 | 22 | 26 | 15 | 30 |
| | Ricon 150 | | | | | | | |
| | Ricon 257 | | | | | | | |
| | Ricon 184MA6 | | | | | | | |
| Cross-linking agent | BMI-70 | 26 | 25 | 25 | 25 | 25 | 25 | 25 |
| | TAIC | 22 | 25 | 25 | 25 | 25 | 25 | 25 |
| Filler | 525A | 60 | 60 | 60 | 60 | 60 | 60 | 60 |
| Flame retardant | BT93 | 15 | 15 | 15 | 15 | 15 | 15 | 15 |
| | Perbutyl-P | 0.2 | 0.2 | 0.2 | 0.2 | 0.2 | 0.2 | 0.2 |
| | MEK | 120 | 120 | 120 | 120 | 120 | 120 | 120 |
| Phase separation in the resin composition | | No | No | No | No | No | Yes | Yes |

4.5. Preparation and Properties of Metal-Clad Laminate

The metal-clad laminates of Examples E1 to E15 and Comparative Examples C1 to C8 were respectively prepared by using the prepared resin compositions. In detail, one of the resin compositions of Examples E1 to E15 and Comparative Examples C1 to C8 was coated on glass fiber cloths (type: 2116; thickness: 0.08 mm) by a roller at a controlled thickness. The coated glass fiber cloths were then placed in an oven and dried at 175° C. for 2 to 15 minutes to produce prepregs in a half-cured state (B-stage) (the resin content of the prepreg was about 56%). Two pieces of the prepregs were superimposed and two sheets of copper foil (0.5 oz.) were respectively superimposed on both of the two external surfaces of the superimposed prepregs to provide a superimposed object. A hot-pressing operation was performed on each of the prepared objects. The hot-pressing conditions were as follows: heating to about 200° C. to 220° C. at a heating rate of 3.0° C./min, and hot-pressing for 180 minutes under a full pressure of 15 kg/cm$^2$ (initial pressure is 8 kg/cm$^2$) at said temperature.

The properties of the prepregs and metal-clad laminates of Examples E1 to E15 and Comparative Examples C1 to C8, including dielectric constant (Dk), dissipation factor (Df), coefficient of thermal expansion (Z-CTE), thermal decomposition temperature (Td), flame retardance level, T288 solder resistance, glass transition temperature (Tg), adhesion strength to copper foil, pressure cooker test (PCT) heat resistance, were tested according to the aforementioned testing methods, and the results are tabulated in Table 5 to Table 7.

TABLE 5

Properties of the prepregs and the metal-clad laminates of Examples E1 to E6 and Comparative Examples C1 to C5

| | E1 | E2 | E3 | E4 | E5 | E6 | C1 | C2 | C3 | C4 | C5 |
|---|---|---|---|---|---|---|---|---|---|---|---|
| Dielectric constant (Dk) | 4.15 | 4.31 | 4.38 | 4.32 | 4.28 | 4.29 | 4.18 | 4.23 | 4.15 | 4.12 | 4.18 |
| Dissipation factor (Df) | 4.18 | 4.39 | 4.47 | 4.55 | 4.50 | 4.41 | 4.13 | 4.27 | 3.99 | 4.08 | 4.05 |
| Z-CTE (%) | 2.43 | 2.26 | 2.18 | 2.29 | 2.35 | 2.01 | 2.67 | 2.7 | 2.71 | 2.88 | 2.75 |

TABLE 5-continued

Properties of the prepregs and the metal-clad laminates of Examples E1 to E6 and Comparative Examples C1 to C5

|  | E1 | E2 | E3 | E4 | E5 | E6 | C1 | C2 | C3 | C4 | C5 |
|---|---|---|---|---|---|---|---|---|---|---|---|
| Thermal decomposition temperature (Td) (° C.) | 432 | 432 | 433 | 433 | 428 | 436 | 423 | 425 | 421 | 422 | 420 |
| Glass transition temperature (Tg) (° C.) | 243 | 244 | 244 | 243 | 241 | 253 | 214 | 243 | 233 | 228 | 234 |
| T288 solder resistance (minute) | >30 | >30 | >30 | >30 | >30 | >30 | >30 | >30 | >30 | >30 | >30 |
| PCT heat resistance test | ○ | ○ | ○ | ○ | ○ | ○ | ○ | ○ | ○ | ○ | ○ |
| Flame retardance level | V-0 | V-0 | V-0 | V-0 | V-0 | V-0 | V-1 | V-1 | V-1 | V-1 | V-1 |
| Adhesion strength to copper foil (lbf/in) | 3.5 | 3.6 | 2.1 | 3.8 | 3.9 | 3.7 | 2.3 | 2.9 | 3.1 | 3.4 | 3.2 |

TABLE 6

Properties of the prepregs and the metal-clad laminates of Examples E7 to E10 and Comparative Example C6

|  | E7 | E8 | E9 | E10 | C6 |
|---|---|---|---|---|---|
| Dielectric constant (Dk) | 3.86 | 3.80 | 3.83 | 3.91 | 3.79 |
| Dissipation factor (Df) | 4.33 | 4.12 | 4.25 | 4.21 | 4.11 |
| Z-CTE (%) | 2.23 | 2.37 | 2.15 | 2.22 | 2.85 |
| Thermal decomposition temperature (Td) (° C.) | 430 | 425 | 435 | 431 | 420 |
| Glass transition temperature (Tg) (° C.) | 239 | 220 | 245 | 244 | 225 |
| T288 solder resistance (minute) | >30 | >30 | >30 | >30 | >30 |
| PCT heat resistance test | ○ | ○ | ○ | ○ | ○ |
| Flame retardance level | V-0 | V-0 | V-0 | V-0 | V-1 |
| Adhesion strength to copper foil (lbf/in) | 4.33 | 4.12 | 4.25 | 4.21 | 4.11 |

TABLE 7

Properties of the prepregs and the metal-clad laminates of Examples E11 to E15 and Comparative Examples C7 and C8

|  | E11 | E12 | E13 | E14 | E15 | C7 | C8 |
|---|---|---|---|---|---|---|---|
| Dielectric constant (Dk) | 3.95 | 3.93 | 3.88 | 3.91 | 3.71 | 3.72 | 3.63 |
| Dissipation factor (Df) | 4.24 | 4.19 | 4.15 | 4.03 | 3.94 | 4.01 | 3.88 |
| Z-CTE (%) | 2.21 | 2.36 | 2.33 | 2.22 | 2.22 | 2.82 | 3.11 |
| Thermal decomposition temperature (Td) (° C.) | 430 | 425 | 419 | 420 | 414 | 422 | 412 |
| Glass transition temperature (Tg) (° C.) | 244 | 239 | 235 | 244 | 244 | 218 | 205 |
| T288 solder resistance (minute) | >30 | >30 | >30 | >30 | >30 | >30 | >30 |
| PCT heat resistance test | ○ | ○ | ○ | ○ | ○ | ○ | ○ |
| Flame retardance level | V-0 | V-0 | V-0 | V-0 | V-1 | V-1 | V-2 |
| Adhesion strength to copper foil (lbf/in) | 4.24 | 4.19 | 4.15 | 4.03 | 3.94 | 4.01 | 3.88 |

As shown in Table 1 and Table 2, when the resin composition comprises a compound having the structure of formula (I) and a vinyl-containing elastomer and does not comprise a polyphenylene ether resin, the weight ratio of the compound having the structure of formula (I) to the vinyl-containing elastomer has to be 20:1 to 5:1. If the amount of the vinyl-containing elastomer is too high (Comparative Examples C1 to C5), phase separation will occur in the resin composition. In addition, as shown in Table 5, when the amount of the vinyl-containing elastomer is too high, the metal-clad laminate made therefrom has a poor coefficient of thermal expansion Z-CTE and flame retardance. By contrast, the resin compositions of Examples E1 to E6 of the present invention did not have a phase separation problem, and the metal-clad laminates made therefrom were provided with outstanding properties.

When the resin composition further comprises a polyphenylene ether resin having an unsaturated functional group, the polyphenylene ether resin can improve the compatibility of the vinyl-containing elastomer in the resin composition, rendering the weight ratio of the compound having the structure of formula (I) to the vinyl-containing elastomer can be 20:1 to 1:1, with the proviso that the amount of the polyphenylene ether resin should be greater than the amount of the vinyl-containing elastomer, otherwise there will be a phase separation problem. As shown in Table 3, Table 4, Table 6, and Table 7, when the aforementioned conditions are fulfilled, no phase separation is observed in the resin composition, and the metal-clad laminates manufactured from the resin composition are provided with outstanding properties (Examples E7 to E15). By contrast, when the amount of the polyphenylene ether resin is not greater than the amount of the vinyl-containing elastomer, phase separation occurs in the resin composition, and the metal-clad laminate made from the resin composition has poor coefficient of thermal expansion Z-CTE and flame retardance (Comparative Examples C6 to C8).

The above examples are used to illustrate the principle and efficacy of the present invention and show the inventive features thereof. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. A resin composition, comprising:

(A) a compound having a structure of formula (I),

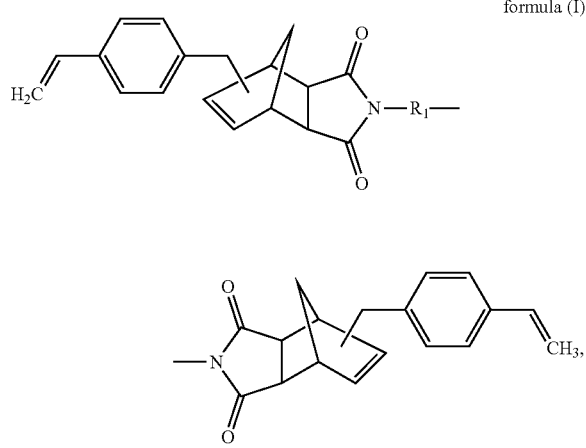

formula (I)

wherein $R_1$ is

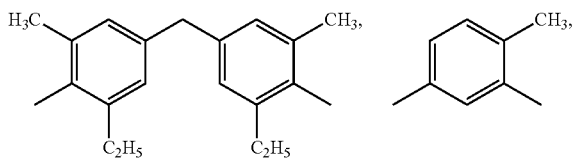

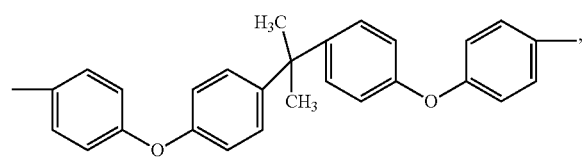

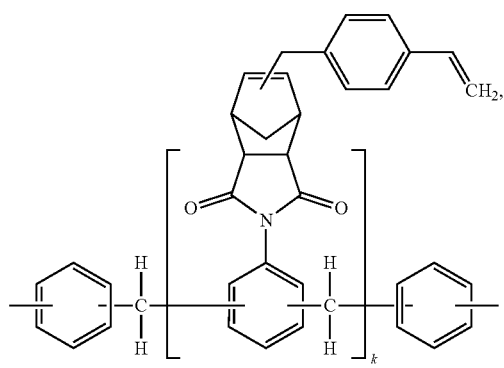

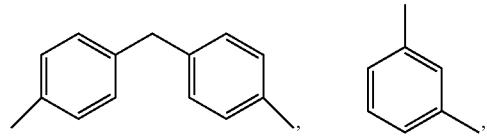

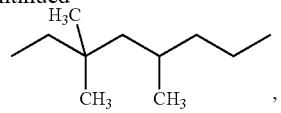

wherein k is an integer of 1 to 5; and (B) a vinyl-containing elastomer, wherein the weight ratio of the compound having the structure of formula (I) to the vinyl-containing elastomer is 20:1 to 5:1; and wherein the vinyl-containing elastomer is selected from the group consisting of polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional derivatives of the foregoing, and combinations thereof.

2. The resin composition of claim 1, further comprising a cross-linking agent selected from the group consisting of polyfunctional allylic compounds, polyfunctional acrylates, polyfunctional acrylamides, polyfunctional styrenic compounds, bismaleimide compounds, and combinations thereof.

3. The resin composition of claim 1, further comprising a flame retardant selected from the group consisting of tetrabromobisphenol A, decabromodiphenyloxide, decabrominated diphenyl ethane, 1,2-bis(tribromophenyl) ethane, brominated epoxy oligomers, octabromotrimethylphenyl indane, bis(2,3-dibromopropyl ether), tris(tribromophenyl) triazine, brominated aliphatic hydrocarbons, brominated aromatic hydrocarbons, phosphinates, polyphosphates, phosphonium salts, phosphate esters, phosphazenes, phosphite esters, phosphine oxides, and combinations thereof.

4. The resin composition of claim 1, further comprising a free radical initiator.

5. The resin composition of claim 1, further comprising a filler selected from the group consisting of silica, aluminum oxide, aluminum hydroxide, magnesium oxide, magnesium hydroxide, calcium carbonate, talc, clay, aluminum nitride, boron nitride, silicon nitride, silicon aluminum carbide, silicon carbide, sodium carbonate, magnesium carbonate, titanium dioxide, zinc oxide, zirconium oxide, quartz, diamond powder, diamond-like powder, graphite, graphene, potassium titanate, strontium titanate, barium titanate, ceramic fiber, zinc molybdate, ammonium molybdate, zinc borate, calcium phosphate, calcined kaolin, pryan, mica, boehmite, hydrotalcite, carbon nanotube, polytetrafluoroethylene (PTFE) powder, hollow glass bead, and combinations thereof.

6. A prepreg, which is prepared by impregnating a substrate with the resin composition of claim 1 or by coating the resin composition of claim 1 onto a substrate and drying the impregnated or coated substrate.

7. A metal-clad laminate, which is prepared by laminating the prepreg of claim 6 and a metal foil.

8. A printed circuit board, which is prepared from the metal-clad laminate of claim 7.

9. A metal-clad laminate, which is prepared by coating the resin composition of claim 1 onto a metal foil and drying the coated metal foil.

10. A printed circuit board, which is prepared from the metal-clad laminate of claim 9.

11. A resin composition comprising:
(A) a compound having a structure of formula (I),

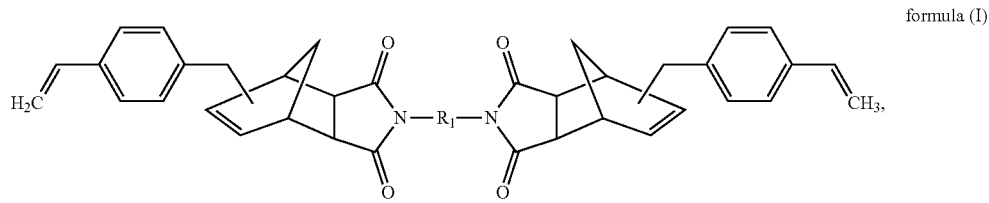
formula (I)

wherein $R_1$ is an organic group;
(B) a vinyl containing elastomer; and
(C) a polyphenylene ether resin having an unsaturated functional group, which is represented by the following formula (II),

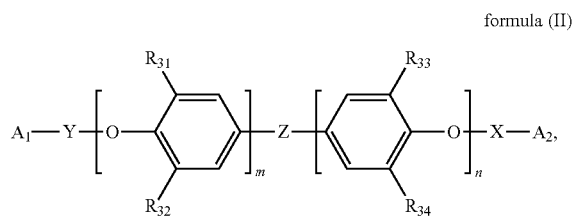
formula (II)

wherein,
$R_{31}$, $R_{32}$, $R_{33}$ and $R34$ are independently H, or a substituted or unsubstituted C1-C5 alkyl;
m and n are independently an integer of 0 to 100, with the proviso that m and n are not 0 at the same time;
Z is absent, or an aryl,

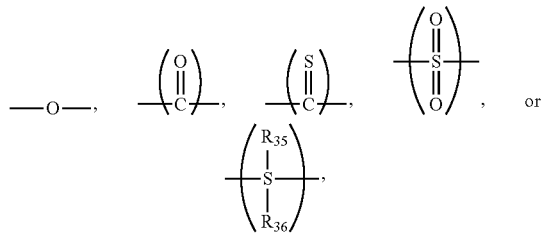

wherein $R_{35}$ and $R_{36}$ are independently H or a C1-C12 alkyl;
X and Y are independently absent, a carbonyl group, or an alkenyl-containing group; and
$A_1$ and $A_2$ are independently

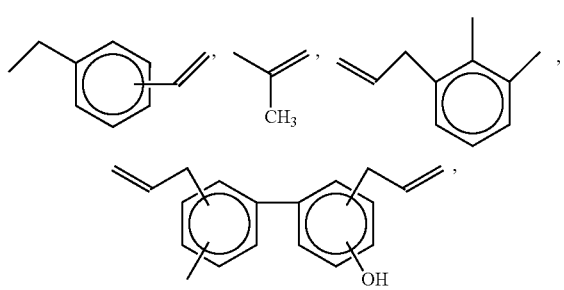

-continued

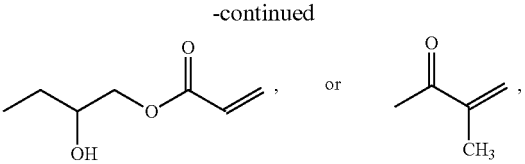

wherein the weight ratio of the compound having the structure of formula (I) to the vinyl-containing elastomer is 20:1 to 1:1; and
wherein the weight content of the polyphenylene ether resin having an unsaturated functional group is greater than the weight content of the vinyl-containing elastomer.

12. The resin composition of claim 11, wherein $R_1$ of formula (I) is

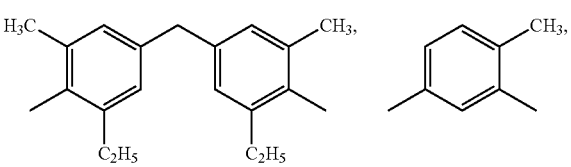

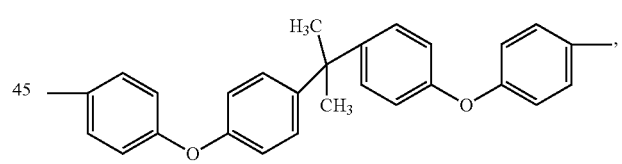

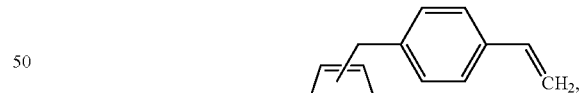

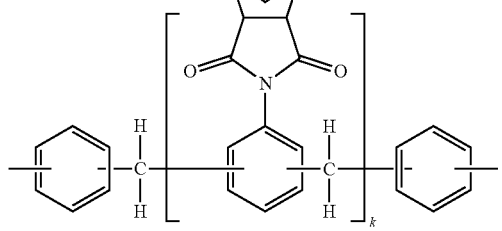

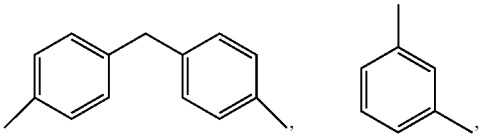

—CH₂—, or 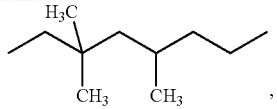, wherein k is an integer of 1 to 5.

13. The resin composition of claim 11, wherein the vinyl-containing elastomer is selected from the group consisting of polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional derivatives of the foregoing, and combinations thereof.

14. The resin composition of claim 11, further comprising a cross-linking agent selected from the group consisting of polyfunctional allylic compounds, polyfunctional acrylates, polyfunctional acrylamides, polyfunctional styrenic compounds, bismaleimide compounds, and combinations thereof.

* * * * *